US011713221B2

(12) United States Patent
Nessler et al.

(10) Patent No.: US 11,713,221 B2
(45) Date of Patent: Aug. 1, 2023

(54) MOBILE CRANE HAVING HEIGHT ADJUSTABLE SUPERSTRUCTURE BALLAST

(71) Applicant: Liebherr-Werk Nenzing GmbH, Nenzing (AT)

(72) Inventors: Wolfgang Nessler, Ausserbraz (AT); Robert Bargehr, Buers (AT)

(73) Assignee: Liebherr-Werk Nenzing GmbH, Nenzing (AT)

(*) Notice: Subject to any disclaimer, the term of this patent is extended or adjusted under 35 U.S.C. 154(b) by 0 days.

(21) Appl. No.: 17/453,790

(22) Filed: Nov. 5, 2021

(65) Prior Publication Data

US 2022/0144603 A1 May 12, 2022

(30) Foreign Application Priority Data

Nov. 6, 2020 (DE) ..................... 20 2020 106 372.3

(51) Int. Cl.
*A01K 89/01* (2006.01)
*B66C 23/74* (2006.01)
*B66C 23/36* (2006.01)

(52) U.S. Cl.
CPC ............ *B66C 23/74* (2013.01); *B66C 23/365* (2013.01); *B66C 2700/0371* (2013.01)

(58) Field of Classification Search
CPC ....... B66C 23/74; B66C 23/365; B66C 23/76; B66C 2700/0371
See application file for complete search history.

(56) References Cited

U.S. PATENT DOCUMENTS

2012/0160795 A1 6/2012 Liu et al.
2015/0246795 A1 9/2015 Copeland
2016/0221804 A1* 8/2016 Torghele ................ B66C 23/76
2018/0022586 A1* 1/2018 Koenig .................. B66C 23/84 212/197

FOREIGN PATENT DOCUMENTS

CN 201214605 Y 4/2009
CN 111847283 A 10/2020
DE 3708458 A1 9/1988
DE 202010002364 U1 * 2/2011 ............. B66C 23/74
DE 202014008661 U1 * 1/2015 ............. B66C 23/76
DE 102016009040 A1 * 1/2018 ............. B66C 23/62
DE 102017009188 B3 * 10/2018
EP 2377804 A1 * 10/2011 ............. B66C 23/34
EP 3050837 B1 * 1/2018 ............. B66C 23/76
JP 2018030718 A * 3/2018 ............. B66C 23/72
KR 20100093480 A * 8/2010

* cited by examiner

*Primary Examiner* — Emmanuel M Marcelo
(74) *Attorney, Agent, or Firm* — McCoy Russell LLP

(57) ABSTRACT

The disclosure relates to a mobile crane, such as a crawler crane, comprising an undercarriage having a chassis, a superstructure rotatably supported on the undercarriage, and superstructure ballast, with the superstructure ballast comprising a ballast mounting apparatus vertically adjustable by means of a lifting device of the superstructure. In accordance with the disclosure, the ballast mounting apparatus is fastenable to the superstructure in an assembly position by means of a single connection element bearing the vertical load of the superstructure ballast. A centering means is furthermore provided that is adapted to take up transverse forces occurring in the assembly position.

18 Claims, 3 Drawing Sheets

MOBILE CRANE HAVING HEIGHT ADJUSTABLE SUPERSTRUCTURE BALLAST

CROSS REFERENCE TO RELATED APPLICATION

The present application claims priority to German Utility Model Patent Application No. 20 2020 106 372.3 filed on Nov. 6, 2020. The entire contents of the above-listed application is hereby incorporated by reference for all purposes.

TECHNICAL FIELD

The present disclosure relates to a mobile crane, such as a crawler crane.

BACKGROUND

Travelable cranes or mobile cranes are as a rule always used when no stationary cranes are available at the deployment site or if they cannot be used for other reasons or only with an increased effort. Typical mobile cranes have an undercarriage having a wheeled chassis or a crawler chassis and a superstructure rotatably supported on the undercarriage and having a boom and rear or superstructure ballast.

SUMMARY

Larger mobile cranes typically have to be dismantled into smaller transport units for transport to the deployment site. Self-erecting systems for the superstructure ballast are inter alia required to be able to erect and dismantle such mobile cranes efficiently and without additional auxiliary devices. Solutions are known for this purpose in which the superstructure ballast is first assembled or stacked on the ground and is then raised to the superstructure via hydraulic lifting cylinders, whereupon the superstructure ballast is fastened to the superstructure.

With such fast-erection systems, the fastening of the superstructure ballast to the superstructure normally takes place via a plurality of pin connections. In this process, access to the fastening elements, the orientation of the superstructure ballast required before the fastening and its fastening or locking to the superstructure are typically difficult and time consuming.

It is therefore the object of the present disclosure to facilitate the attachment and removal of the superstructure ballast in such mobile cranes. The installation process should here take place in a reasonable time and without any particular danger for the operator and should be able to be performed by a single person.

This object is achieved in accordance with the disclosure by a mobile crane. A mobile crane, such as a crawler crane, is accordingly proposed that comprises an undercarriage having a chassis, a superstructure rotatably supported on the undercarriage, and a superstructure ballast. The superstructure ballast has a ballast mounting apparatus that is vertically adjustable by means of a lifting device of the superstructure. The lifting device may be configured to place the superstructure ballast from the superstructure on the ground and conversely to raise it from the ground to the superstructure.

In accordance with the disclosure, the ballast mounting apparatus is fastenable in an assembly position by means of a single connection element at the superstructure receiving or carrying the vertical load of the superstructure ballast. In other words, the total vertical load of the superstructure ballast is carried by this connection element. A centering means is furthermore provided in accordance with the disclosure that is configured to take up transverse forces that occur in the assembly position and that act between the superstructure and the superstructure ballast.

The fastening of the superstructure ballast to the superstructure via a single connection facilitates and accelerates the attachment and dismantling procedure of the superstructure ballast. The centrally arranged connection element can be secured or locked by a single person with little effort. Since the fastening via the connection element represents a single suspension point for the superstructure ballast, transverse forces that are intercepted or transmitted via the centering means can occur on a rotation, slanted position or tilt movement, or translation movement of the superstructure ballast relative to the superstructure. A secure and stable connection is thereby produced between the superstructure ballast and the superstructure that can be established or released fast.

The assembly position here marks a position of the ballast mounting apparatus in which it has been raised to the superstructure by the lifting device and can be locked or is already locked to the superstructure. The transverse forces are therefore not only taken up or transmitted in a state fastened to the superstructure via the connection element, but also even before the fastening via the centering means. The centering means can comprise a plurality of spatially distributed or separately arranged centering elements, whereby the transverse forces are taken up in an optimum manner. The fastening of the superstructure ballast can take place at a base frame of the superstructure.

Embodiments of the disclosure result from the following description.

Provision is made in a possible embodiment that the centering means is configured to automatically align the superstructure ballast or the ballast mounting apparatus in the assembly position on an approach to the superstructure. In other words, the centering means takes on a dual function in that it not only serves the taking up or transmission of transverse forces, but also simultaneously serves the correct alignment or centration of the ballast mounting apparatus on an approach of the superstructure ballast to the superstructure. Only the connection via the connection element thus subsequently has to be established by the workers. For instance, a complex and at times dangerous manual fine alignment of the superstructure ballast can thus be dispensed with.

Provision is made in a further possible embodiment that the centering means is arranged at the ballast mounting apparatus and/or at the superstructure and is adapted to take up or transmit transverse forces acting on the ballast mounting apparatus and/or on the superstructure in the assembly position.

Provision is made in a further possible embodiment that the centering means is adapted to take up or transmit transverse forces occurring by tilting and/or rotating and/or displacing the superstructure ballast in the assembly position.

Provision is made in a further possible embodiment that the centering means comprises at least two centering elements that are arranged at the ballast mounting apparatus and that are configured to move into engagement with centering mounts formed at the superstructure on an approach of the ballast mounting apparatus to the superstructure or that the centering means comprises at least two centering elements that are arranged at the superstructure and that are configured to move into engagement with centering mounts formed at the ballast mounting apparatus on an approach of the ballast mounting apparatus to the superstructure.

On an approach of the ballast mounting apparatus to the superstructure, the centering elements engage or move into the associated centering mounts and thereby already provide a correct alignment/centering of the ballast mounting apparatus relative to the superstructure on the approach. The centering elements are traveled a maximum distance into the centering mounts in the assembly position and transmit transverse forces that occur.

Two centering elements can be sufficient for an effective taking up of the transverse forces that may occur in dependence on the type of connection between the superstructure and the ballast mounting apparatus, such as on the shape of the connection element and on the number of the possible degrees of freedom for movements of the superstructure ballast that generate transverse forces. If the design of the connection or of the connection element, for example, only permits a movement of the superstructure ballast along a single degree of freedom, an arrangement of the centering elements along a line perpendicular to or in parallel with this degree of freedom may be sufficient under certain circumstances. More than two centering elements can be, however, present, which enables a better taking up of the transverse forces and a more stable support of the superstructure ballast at the superstructure.

Provision is made in a further possible embodiment that the centering elements are shaped as conical and—depending on where they are arranged—project from the ballast mounting apparatus or from the superstructure in the direction of the lifting direction of the superstructure ballast. The centering elements are therefore aligned in parallel. They taper conically to the centering mounts in this respect and provide a simple threading. The superstructure ballast is automatically correctly aligned in the assembly position on the continued lifting due to the conical shape.

The centering elements can be pins, bolts, bollards, or other elements, such as elements shaped in longitudinal form, that can be pushed into mounts that are of complementary shape.

In a further possible embodiment, four centering elements are provided and are arranged such that they form the corners of a rectangle. An effective taking up of the transverse forces and a stable support of the superstructure ballast at the superstructure thereby result. Alternatively, three centering elements can also be provided that are, for example, arranged in the form of an equilateral triangle. More than four centering elements are also conceivable here.

Provision is made in a further possible embodiment that the ballast mounting apparatus comprises a center part and two side parts arranged laterally therefrom, with a respective at least one ballast element being able to be placed or stacked on the side parts and with the centering elements or centering mounts being arranged at the center part. The centering elements can be arranged at the center part, can be aligned in parallel, and can taper conically toward the superstructure. The center part can have a substantially rectangular form, with four centering elements being arranged at the corners of the center part. The center part can equally have one or more swept sides.

The center part and the side parts can be connected to one another in one piece, i.e. can, for example, be regions of a common ballast mounting plate. It is equally conceivable that the side parts are installed or installable laterally at the center part.

Provision is made in a further possible embodiment that the ballast mounting apparatus is vertically adjusted via at least one hydraulic lifting cylinder fastened to the superstructure. The lifting cylinder that can also be called a ballasting cylinder, may be configured to place the superstructure ballast from the superstructure on the ground and to raise it from the ground to the superstructure. An embodiment is likewise conceivable in which the superstructure ballast can be placed on a placement surface of the undercarriage. Two parallel lifting cylinders can be provided. In some embodiments, the lifting cylinder or cylinders is/are fastened to a base frame of the superstructure.

Provision is made in a further possible embodiment that a fastening means having at least one pulling means is arranged at the lifting cylinder, such as at the extensible end of a piston rod of the lifting cylinder. The pulling means serves the lifting of the superstructure ballast and is connectable to an abutment point of the ballast mounting apparatus. Two pulling means can be provided per lifting cylinder or per fastening element. Four abutment points thus result overall with two lifting cylinders so that the superstructure ballast can be raised in a manner secure against tilting. The pulling means can e.g. be a chain, a bar, a band, a wire rope, or a combination thereof.

The abutment points can be arranged or formed directly at the ballast mounting apparatus or at mounting arms connected to the latter and optionally supported in an articulated manner. The ballast mounting apparatus can have a center part and two side parts arranged laterally therefrom, with the abutment points or the mounting arms being arranged at the center part.

In certain embodiments, the lifting cylinder or cylinders is/are upwardly travelable. The fastening element may be substantially of anchor shape or has two lateral arms to which the pulling means are fastened.

Provision is made in a further possible embodiment that the lifting cylinder has a guide cone and the ballast mounting apparatus has a recess that is associated with the guide cone, said guide cone and recess being arranged and configured such that the guide cone moves into the associated recess on an approach of the superstructure ballast to the superstructure and pre-positions or precenters the ballast assembly apparatus before the final reaching of the mounting position. The recess may be conical or of funnel shape.

The lifting cylinder can project downwardly beyond the base frame of the superstructure. The recess is arranged exactly below the lifting cylinder in the ballast assembly apparatus so that the lower part of the lifting cylinder that has the guide cone travels into the recess in the last section on the raising before reaching the assembly position. An automatic positioning or alignment of the ballast mounting apparatus relative to the lifting cylinder and thus to the superstructure takes place due to the conical shape. Two lifting cylinders that each have a guide cone and accordingly two recesses can be provided.

In this respect, it is only a rough pre-positioning while the fine alignment takes place by means of the centering means—for example, by means of a plurality of conically shaped centering elements. A manual alignment by the operator can thus be avoided, which facilitates the setting up procedure and increases safety.

Provision is made in a further possible embodiment that the guide cone is formed at a cylinder jacket of the lifting cylinder or is formed by an element connected to the lifting cylinder, such as a conically shaped bushing or sleeve. The bushing can alternatively be connected to the superstructure or to a base frame of the superstructure, with a part of the lifting cylinder extending within the bushing.

Provision is made in a further possible embodiment that the connection element is a pin that can be pushed through pin eyes of the superstructure and of the ballast mounting apparatus that overlap in the assembly position and can be lockable. The connection element can be a force measuring axle that is of cylinder shape.

The pin eyes are arranged at an upper side of the ballast mounting apparatus and at a lower side of the superstructure or of a base frame of the superstructure. The pin eyes overlap in the assembly position so that the pin or the force measuring axle can be pushed through and a pin connection can thus be established. The pin connection here takes over the complete vertical load of the superstructure ballast and can be secured or locked fast and simply.

Provision is made in a further possible embodiment that the pin or the force measuring axle can be pushed into the pin eyes along the longitudinal axis of the superstructure, that is perpendicular to the lifting direction of the superstructure ballast. The lifting cylinders may be arranged along a line perpendicular thereto.

The pin eyes for establishing the pin connection can be attached centrally to the superstructure or centrally to the ballast mounting plate. A central suspension of the superstructure ballast at the superstructure thereby results.

The ballast mounting apparatus can be a ballast mounting plate and the ballast elements may be ballast plates that can be stacked on one another. The superstructure ballast can be arranged at the rear of the superstructure, with the superstructure furthermore having an operator's cabin and/or a luffable boom. An A frame via which the boom can be guyed can furthermore be supported at the superstructure.

BRIEF DESCRIPTION OF THE FIGURES

Further features and details of the disclosure result from the embodiments explained in the following with reference to the Figures. There are shown.

DETAILED DESCRIPTION

Figure 1:
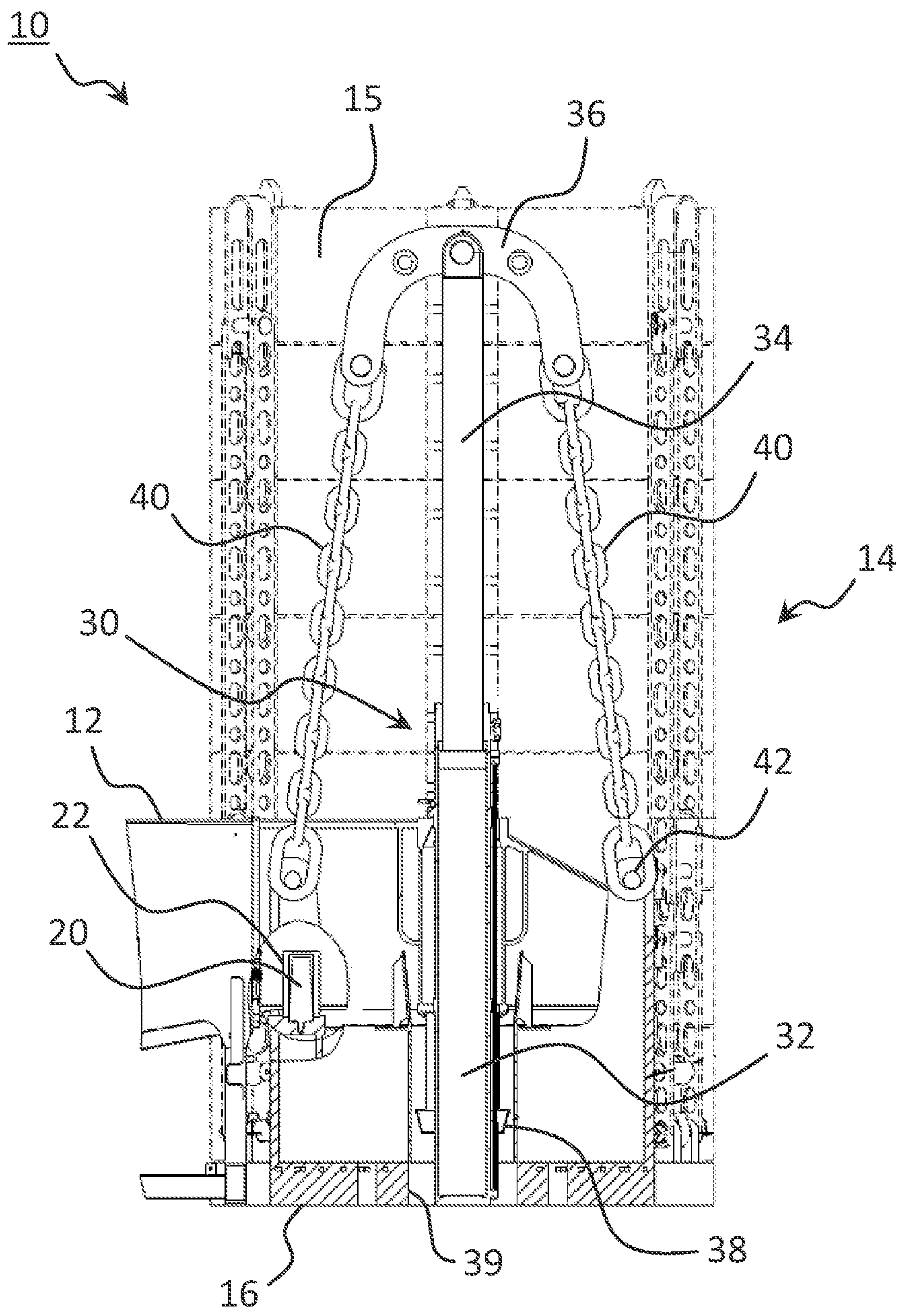
FIG. 1: a lateral sectional view through the superstructure ballast that is mounted at the superstructure of the mobile crane in accordance with the disclosure.
Figure 2:
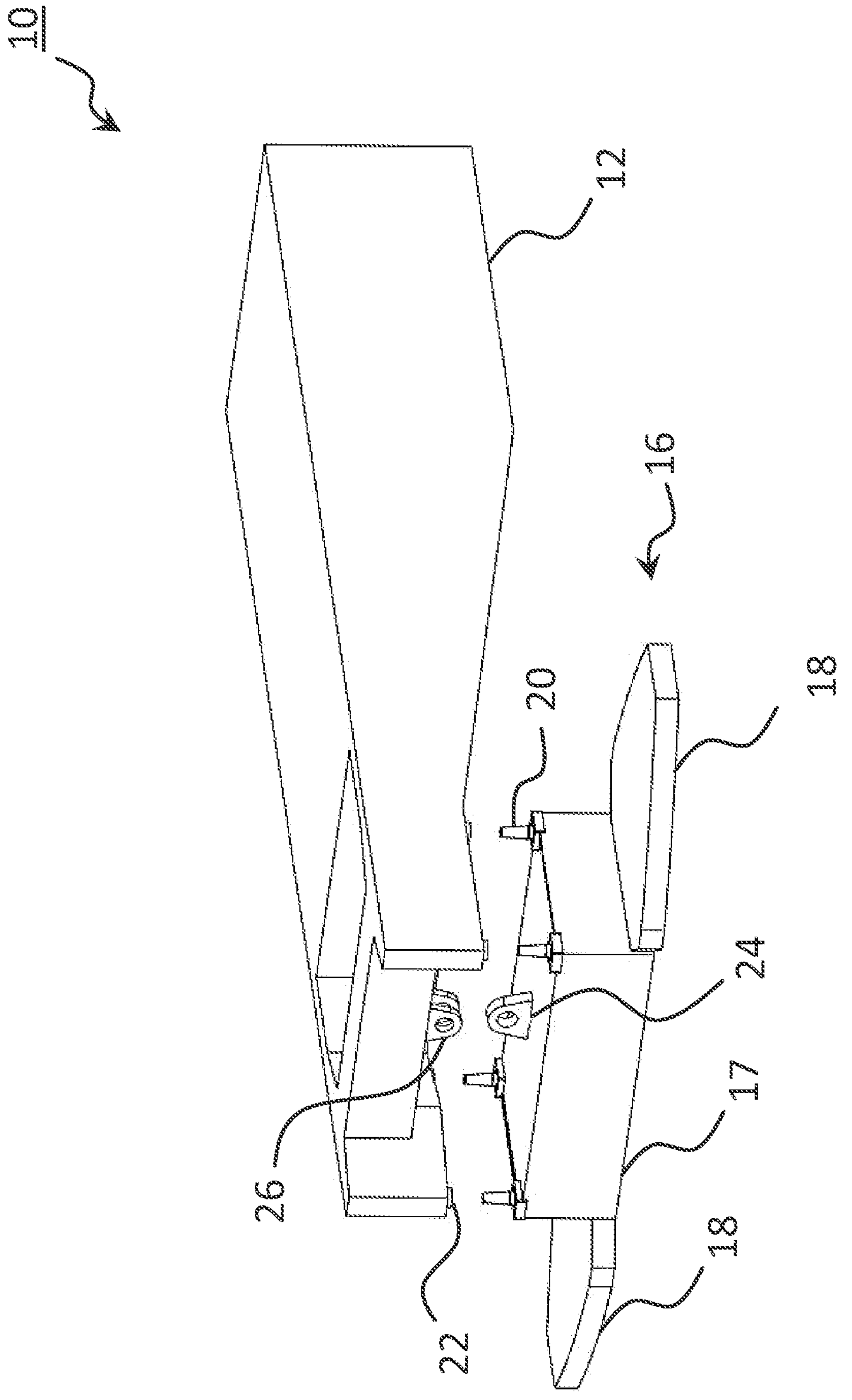
FIG. 2: a schematic representation of the ballast mounting apparatus spaced apart from the superstructure in a perspective view.
Figure 3:
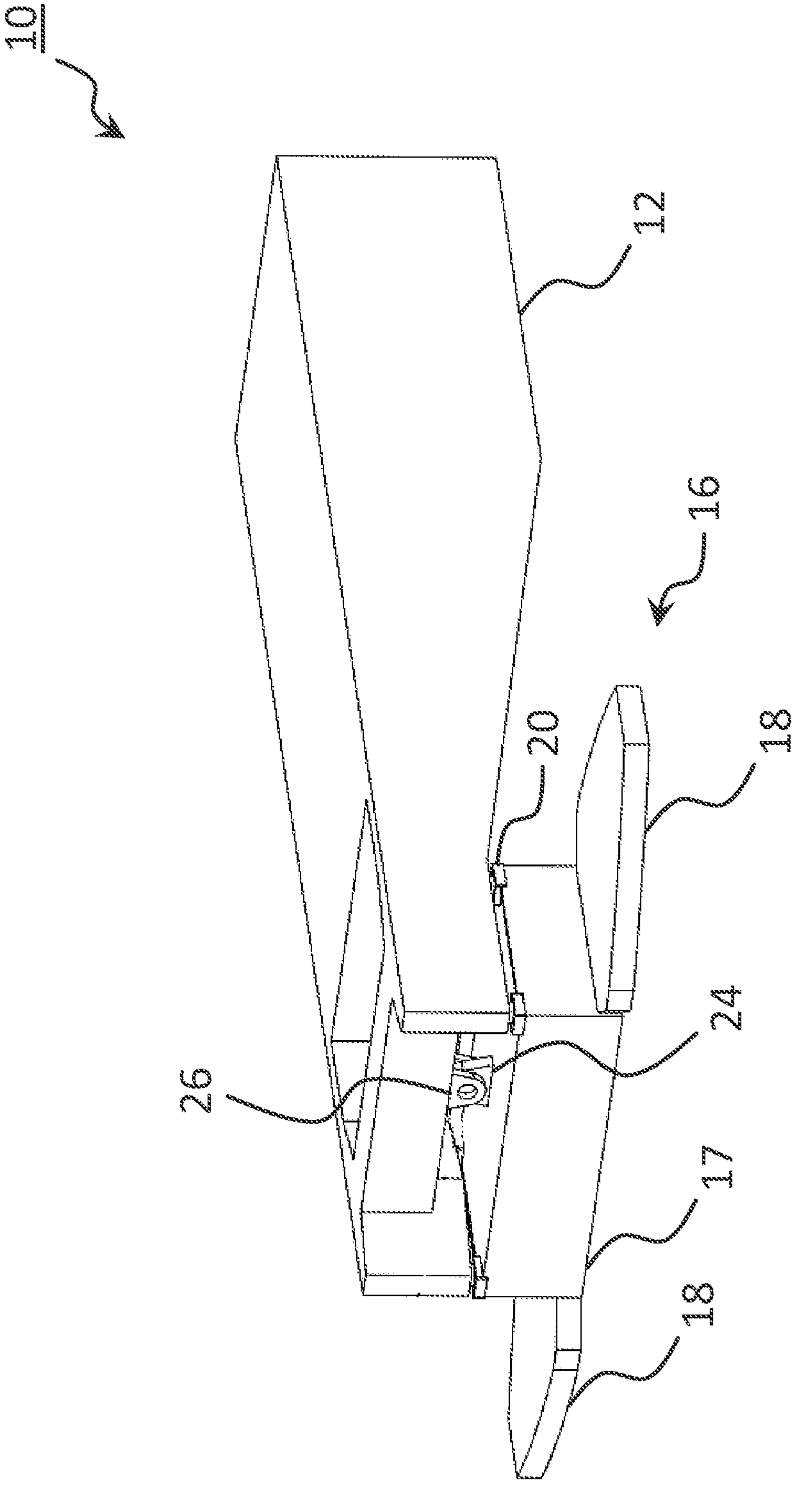
FIG. 3: the view in accordance with FIG. 2, with the ballast mounting apparatus being in the assembly position.

FIGS. 1-3 are drawn approximately to scale, although other relative dimensions may be used. Further, the figures show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example FIG. 1 shows a section through the superstructure 12 and the superstructure ballast 14 of an embodiment of the mobile crane 10 in accordance with the disclosure in a side view. The mobile crane 10 is a crawler crane. Only the end region of the rear of the superstructure 12 to which the superstructure ballast 14 is fastened or fastenable is shown in the sectional view.

The superstructure ballast 14 comprises a ballast mounting apparatus 16 on which a plurality of individual ballast elements or ballast plates 15 are stacked. The ballast mounting apparatus 16 is vertically adjustable together with the ballast 15 placed thereon via a lifting device of the mobile crane 10, with the ballast mounting apparatus 16 placed on the ground being able to be raised from the bottom up to the superstructure 12 to be able to fasten it there. Conversely, the ballast mounting apparatus together with the ballast 15 placed thereon can be placed down on the ground again via the lifting device.

A perspective view of the rear region of the superstructure 12 and of the ballast mounting apparatus 16 is shown in FIG. 2. It is a schematic representation in which further elements such as ballast plates 15 or the lifting device have been removed. The ballast mounting apparatus 16 is spaced apart from the superstructure 12 in FIG. 2.

In the embodiment shown in FIG. 2, the ballast mounting apparatus 16 comprises a substantially rectangular, elevated center part 17 and two plate-like side parts 18 that are arranged at both sides thereof and that are substantially trapezoidal viewed from above. Alternatively, the ballast mounting apparatus 16 can also be configured as a single-piece and substantially flat ballast mounting plate. The exact base shape of the ballast mounting apparatus 16 is, however, of no further relevance to the idea in accordance with the disclosure.

The lifting device forms a self-erection system for the self-assembly of the superstructure ballast 14, for example, after a transport of the mobile crane 10 dismantled into a plurality of parts to a deployment site. The lifting device comprises two parallel hydraulic lifting cylinders or ballasting cylinders 30 fastened to the superstructure 12 in the rear region. Each ballasting cylinder 30 comprises a cylinder jacket 32 connected to the superstructure 12 and a piston rod 34 that is displaceably supported therein and at whose extensible end an anchor-like or wing-like fastening element 36 is attached.

The fastening element 36 can be recognized in FIG. 1 whose sectional view in the region of one of the two lifting cylinders 30 extends in parallel with the longitudinal axis of the superstructure 12. The fastening element 36 has two laterally projecting wing arms to which pulling means 40 formed as chains are fastened. The chains 40 are attached to corresponding attachment points 42 of the ballast mounting apparatus 16. The ballast mounting apparatus 16 thus has a total of four attachment points 42 that are arranged in the form of a rectangle in a plan view.

To set up the superstructure ballast 14, the ballast mounting apparatus 16 is placed on the ground below the superstructure rear (or the latter is placed above the superstructure ballast 14). A plurality of respective ballast plates 15 are stacked on the side parts 18. The lifting cylinders 30 are retracted here so that the chains 40 reach up to the ballast mounting apparatus 16 and can be fastened to the attachment points 42 arranged at the center part 17. The total superstructure ballast 14 is raised from below to the superstructure 12 by extending the lifting cylinders 30 (the piston rods 34 move upward in this process).

The center part 17 has approximately the same width as the part of the superstructure 12 (or of the base frame of the superstructure 12 to which the superstructure ballast 14 is fastened) located above. The lifting cylinders 30 are located between the ballast stacks 15 supported on the side parts 18.

As can be recognized in FIG. 1, the lifting cylinders 30 project downwardly beyond the superstructure 12 (or the base frame) and each have a downwardly tapering conical region or guide cone 38. The guide cones 38 travel into correspondingly provided recesses 39 that are formed in the ballast mounting apparatus 16 and that can be of funnel shape from a certain height onward on the raising of the superstructure ballast 14. A correct threading of the lower sides of the lifting cylinders 30 into the recesses 39 is ensured by the conical shape and the ballast mounting apparatus 16 or the total superstructure ballast 14 is automatically precentered or pre-positioned during the raising. This rough alignment takes place here before the ballast mounting apparatus 16 has reached its end position for fastening to the superstructure 12 (=assembly position).

As can be recognized in FIG. 2, the ballast mounting apparatus 16 has four centering elements 20 at the center part 17 that are arranged at the upper side of the center part 17 at its corners and that therefore form the corners of a rectangle. The centering elements 20 are formed as upwardly tapering conical pins that extend in parallel with the lifting direction of the ballast mounting apparatus 16 and project therefrom in the direction of the superstructure 12.

Four correspondingly arranged centering mounts 22 into which the centering elements 20 travel on the raising are provided at the lower side of the superstructure 12. The centering mounts 22 can likewise be formed as conical or of funnel shape and together with the centering elements 20 form a centering means that effects a fine alignment of the ballast mounting apparatus 16 or of the total superstructure ballast 14 after the pre-positioning by the guide cones 38 of the lifting cylinders 30. The ballast mounting apparatus 16 is thus automatically correctly positioned in the last section of the lifting path.

FIG. 3 shows the ballast mounting apparatus 16 in the assembly position, i.e. in the maximum raised position in which it can be fastened to the superstructure 12. Pin eyes 24, 26 that overlap in the assembly position are provided at the lower side of the superstructure 12 and at the upper side of the center part 17 of the ballast mounting apparatus 16 to connect the superstructure ballast 14 to the superstructure 12. Two pin eyes 26 at the superstructure 12 and one pin eye 24 at the ballast mounting apparatus 16 here form a fork finger connection.

The connection between the superstructure ballast 14 and the superstructure 12 is established by a single connection element (not shown) that is pushed through the overlapping pin eyes 24, 26. The connection element can e.g. be a simple pin or a cylindrical force measuring axle. This pin connection can easily be established and locked or released again. No auxiliary crane or other external tool has to be used for this purpose. The connection can be established or released by a single operator.

The pin connection is arranged centrally with respect to the ballast mounting apparatus 16 or to the superstructure ballast 14, i.e. it is located centrally in the rectangle formed by the centering elements 20. In other words, the pin connection has the same distance from all the centering elements 20 and from the ballast stacks 15.

The pin connection or the connection element bears the total vertical load of the superstructure ballast 14. The transverse forces that arise due to a rotation, slanted position, and/or displacement of the superstructure ballast 14 relative to the superstructure 12 are taken up or transmitted in an optimum manner by the centering elements 20.

REFERENCE NUMERAL LIST

10 mobile crane
12 superstructure
14 superstructure ballast
15 ballast element (ballast plate)
16 ballast mounting apparatus
17 center part
18 side part
20 centering element
22 centering mount
24 pin eye
26 pin eye
30 lifting cylinder
32 cylinder jacket
34 piston rod
36 fastening element
38 guide cone
39 recess
40 pulling means (chain)
42 attachment point

The invention claimed is:

1. A mobile crane comprising an undercarriage having a chassis, a superstructure rotatably supported on the undercarriage, and superstructure ballast that comprises a ballast mounting apparatus vertically adjustable by means of a lifting device of the superstructure, wherein the ballast mounting apparatus is fastenable to the superstructure in an assembly position by means of a single connection element bearing a vertical load of the superstructure ballast, with a centering means being provided that is adapted to take up transverse forces occurring in the assembly position.

2. The mobile crane in accordance with claim 1, wherein the centering means is configured to automatically align the superstructure ballast in the assembly position on an approach to the superstructure.

3. The mobile crane in accordance with claim 1, wherein the centering means is arranged at the ballast mounting apparatus and/or at the superstructure and is adapted to take up transverse forces acting on the ballast mounting apparatus and/or on the superstructure in the assembly position.

4. The mobile crane in accordance with claim 1, wherein the centering means is adapted to take up transverse forces occurring in the assembly position by tilting and/or rotating and/or displacing the superstructure ballast.

5. The mobile crane in accordance with claim 1, wherein the centering means comprises at least two centering elements that are arranged at the ballast mounting apparatus/at the superstructure and that are configured to move into engagement with centering mounts formed at the superstructure/at the ballast mounting apparatus on an approach of the ballast mounting apparatus to the superstructure.

6. The mobile crane in accordance with claim 5, wherein the centering elements are conically shaped and project from the ballast mounting apparatus/from the superstructure along a lifting direction of the superstructure ballast.

7. The mobile crane in accordance with claim 5, wherein four centering elements are provided and are arranged such that they form the corners of a rectangle.

8. The mobile crane in accordance with claim 5, wherein the ballast mounting apparatus comprises a center part and two side parts arranged laterally therefrom, with a respective at least one ballast element being able to be placed or stacked on the side parts and with the centering elements or centering mounts being arranged at the center part.

9. The mobile crane in accordance with claim 1, wherein the ballast mounting apparatus is vertically adjustable via at least one hydraulic lifting cylinder(s) fastened to the superstructure, with the lifting cylinder being configured to place the superstructure ballast from the superstructure on the ground and to raise it from the ground to the superstructure.

10. The mobile crane in accordance with claim 9, wherein a fastening element is arranged with at least one pulling means at the lifting cylinder with the pulling means being connectable to an attachment point of the ballast mounting apparatus to raise the superstructure ballast.

11. The mobile crane in accordance with claim 9, wherein the lifting cylinder has a guide cone and the ballast mounting apparatus has a recess that is associated with the guide cone, said guide cone and recess being arranged and configured such that the guide cone moves into the associated recess on an approach of the superstructure ballast to the superstructure and pre-positions the ballast mounting apparatus before reaching the mounting position.

12. The mobile crane in accordance with claim 9, wherein the ballast mounting apparatus is vertically adjustable via at least two hydraulic lifting cylinder(s) fastened to the superstructure.

13. The mobile crane in accordance with claim 11, wherein the guide cone is formed at a cylinder jacket of the lifting cylinder or is formed by an element connected to the lifting cylinder.

14. The mobile crane in accordance with claim 13, wherein the element connected to the lifting cylinder is a conically shaped bushing.

15. The mobile crane in accordance with claim 10, wherein the pulling means is at an extensible end of a piston rod of the lifting cylinder.

16. The mobile crane in accordance with claim 1, wherein the connection element is a pin or a force measuring axle that can be pushed through pin eyes of the superstructure and of the ballast mounting apparatus that overlap in the assembly position and is lockable.

17. The mobile crane in accordance with claim 16, wherein the pin or the force measuring axle is pushable into the pin eyes along the longitudinal axis of the superstructure.

18. The mobile crane in accordance with claim 1, wherein the crane is a crawler crane.

* * * * *